H. E. BEIGHLEE.
ELECTRIC PYROMETER.
APPLICATION FILED JUNE 15, 1908.

1,048,930.

Patented Dec. 31, 1912.

Witnesses:
J. C. Turner
Jno. F. Oberlin

Inventor:
H. Earl Beighlee
by J. B. Fay
Attorney.

UNITED STATES PATENT OFFICE.

HENRY EARL BEIGHLEE, OF EAST CLEVELAND, OHIO.

ELECTRIC PYROMETER.

1,048,930. Specification of Letters Patent. Patented Dec. 31, 1912.

Application filed June 15, 1908. Serial No. 438,470.

*To all whom it may concern:*

Be it known that I, HENRY EARL BEIGHLEE, a citizen of the United States, resident of East Cleveland, county of Cuyahoga, and State of Ohio, have invented a new and useful Improvement in Electric Pyrometers, of which the following is a specification, the principle of the invention being herein explained and the best mode in which I have contemplated applying that principle, so as to distinguish it from other inventions.

The present invention, relating to the art of pyrometry, as indicated, has more particular regard to thermo-metric apparatus of an electric character. Of such apparatus, as is well known, there have been only two types developed that give reliable and exact results, these depending for their action, the one upon the rise in electrical resistance of a short length of platinum wire when subjected to heat, and the other upon the electro-motive force set up at the heat junction of a refractory thermo-couple. Without discussing in detail the scientific aspects of these two methods of thermo-electric pyrometry, it may be stated that the former type of apparatus, namely, the platinum resistance pyrometer is conceded in general to be the better.

The object of the present invention is the provision of such a resistance pyrometer that while retaining all the advantages inherent in this system of heat measurement, will in addition be direct reading as well as susceptible of easy and frequent adjustment, thus overcoming the tendency to error that would otherwise be present in the practical use of this method.

To the accomplishment of these and related ends, said invention, then, consists of the means hereinafter fully set forth and particularly pointed out in the claims.

The annexed drawing and the following description set forth in detail certain mechanism embodying the invention, such disclosed means constituting, however, but one of various mechanical forms in which the principle of the invention may be used.

Figure 1:
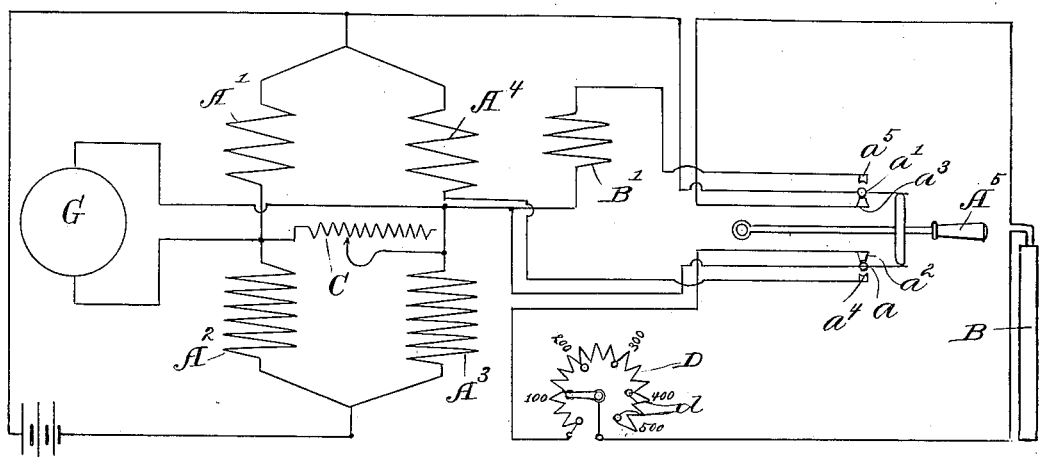
Figure 2:
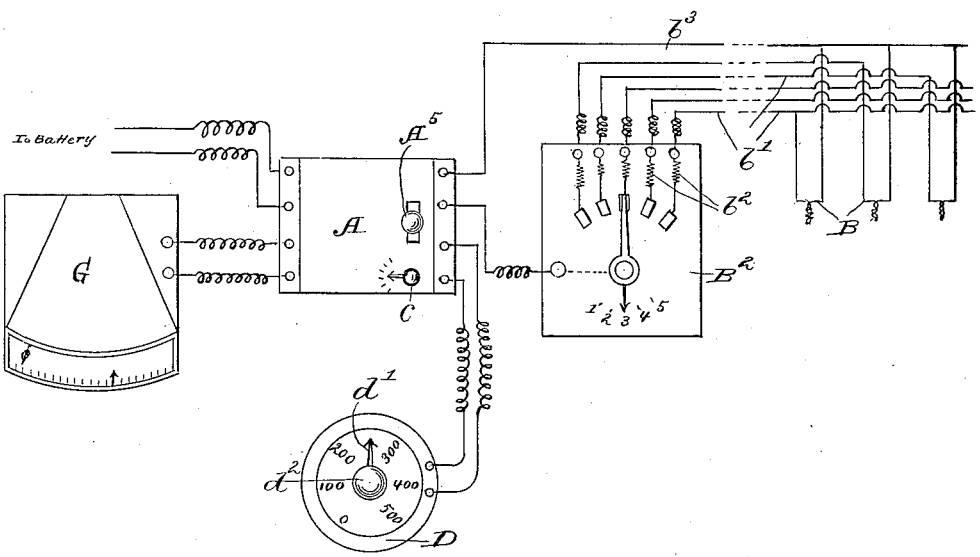

In said annexed drawing: Figure 1 is a diagrammatic view of pyrometric apparatus involving my several improvements; and Fig. 2 is a view showing the general lay-out of the apparatus and connections as arranged to take temperatures at various separated points.

Preliminarily to noting more particularly the construction of the apparatus which I employ it will be well to refer to the several types of resistance pyrometers that have heretofore been devised. In one method a differential galvanometer and a set of resistance coils are employed, which used in conjunction with a suitable battery, give the required resistance in ohms, the corresponding temperature being read off a scale supplied with the instrument. In lieu of this arrangement, which has obvious disadvantages, it has been proposed to substitute for the set of resistance coils an indicator resembling a direct reading ohm-meter and consisting of two coils capable of rotation in a non-homogeneous magnetic field. Still another arrangement of apparatus for obtaining direct temperature readings consists of a Wheatstone bridge combined with a D'Arsonval galvanometer, the variable arm of the bridge being arranged in the form of a circle traversed by a sliding contact arm carrying an index, which moves over a circular scale calibrated to read directly in degrees Fahrenheit. The difficulties inherent in each of these several types of direct reading apparatus can be more advantageously adverted to after my own apparatus has been described; such description will hence follow.

As in the type of apparatus last referred to above my improved resistance pyrometer comprises resistance coils arranged in the form of a Wheatstone bridge. Of these coils, however, the resistance of three (viz. $A'$, $A^2$ and $A^3$) are fixed and therefore known, instead of only two, the arm of variable resistance being the one in which is included the thermo-sensitive resistance coil B that constitutes the pyrometer proper. Of the three known resistances the one $A'$ that is paired with the thermo-sensitive resistance coil B is preferably considerably lower than the two remaining ones $A^3$, $A^2$. Across the terminals of such paired resistances, $A'$, B and $A^2$, $A^3$, is connected an electric measuring instrument G in the form of a sensitive (D'Arsonval) galvanometer, and in parallel with the latter, a variable resistance C, obviously constituting a shunt circuit for such galvanometer.

Included in the single variable arm of the bridge, along with the thermo-sensitive resistance coil B just referred to, is another variable resistance D, the character and function of which will be taken up presently in greater detail. This resistance is preferably in the form of a step-by-step rheostat, successive contacts $d$ thereon being indicated by a pointer $d'$ as shown in Fig. 2. In connection with this same arm of the bridge there are likewise provided two other coils $A^4$, $B'$, each of which is adapted to be substituted for the thermo-sensitive resistance coil B and rheostat D associated therewith, suitable switches being provided for this purpose. A battery is connected, in the usual fashion, with the respective pairs of coils entering into the bridge. Of the two substitute coils $A^4$ $B'$ the former is made of a resistance exactly equal to that of paired resistance $A'$ so that when thrown in the bridge, should be balanced and the galvanometer read zero. Coil $B'$ on the contrary is made of a resistance greater than coil $A'$, the difference corresponding with a predetermined temperature reading, which reading should be indicated, accordingly, by the instrument when this coil is thrown in.

Assuming that the platinum spiral constituting the thermo-sensitive resistance coil is of such dimensions that it will increase in resistance from 10 ohms to 44.9 ohms as its temperature rises from 14 degrees C. to 1205 degrees C. (equals 58 F. to 2204 degrees F.) and that the galvanometer has been adjusted for a predetermined limited range of potential corresponding to a predetermined variation in the balance between such variable arm of the bridge and the arm of fixed resistance $A'$ paired therewith, it will be obvious that the potential, whatever the voltage of the battery and resistance of the battery circuit (including the other arms of the bridge and the instrument), can be brought within the range aforesaid by a proper adjustment of the variable resistance D associated with such thermo-sensitive coil. This potential within the range thus utilized will likewise be proportional to variations in the resistance introduced within corresponding limits in the resistance of the bridge arm that includes the thermo-sensitive resistance by reason of changes in the temperature to which such last named resistance is subjected. Accordingly by properly graduating, or calibrating, such galvanometer a direct reading in heat units may be secured.

Obviously by varying the amount of the resistance interjected in such bridge arm wherein the thermo-sensitive resistance is included, the same galvanometer and scale may be thus utilized to indicate variations in temperature for successive ranges, the variation in potential across the galvanometer being the same for each successive range. Accordingly the several coils entering into the construction of the step-by-step rheostat are made to correspond with definite ranges in temperature, so that, for example, when the thermo-sensitive resistance under a temperature varying between 900 and 1000 degrees F. is connected in series with such variable resistance the potential across the galvanometer will vary through the same range that it would were such thermo-sensitive resistance subjected to a temperature of between 600 and 700 degrees and a corresponding step of the rheostat included in circuit therewith.

From the arrangement of the apparatus and connections illustrated in Fig. 2, it will be seen that I prefer to include the resistance coils properly appertaining to the Wheatstone bridge in a case or box A by themselves together with the control switch. The latter is so arranged that the thermo-sensitive resistance will be normally connected in the corresponding arm of the bridge, being retained in proper position by having the switch in the form of two spring contact members $a$ $a'$, Fig. 1, thus normally held against corresponding fixed contacts $a^2$ $a^3$. By moving the lever $A^5$ in one direction spring contact $a'$ will be moved from its adjacent fixed contact $a^3$ to another contact $a^5$, whereby connection through the thermo-sensitive resistance coil B is broken off and simultaneously the fixed resistance $B'$ thrown in. By thus substituting for the variable or unknown resistance of the temperature coil a known resistance, the reading of the galvanometer is predetermined and in the event that it does not properly record such fictitious temperature it can be made to do so by adjusting the variable resistance C in the shunt circuit so that the pointer will coincide with the correct mark on the scale. By means of this "checking" test I can find out at any time whether the meter is low or the battery weakened, and in the event of either state of affairs the instrument can at once be brought up to standard by the simple manipulation described.

By moving the lever of the controlling switch $A^5$ in the opposite direction to that just described, the other spring contact $a$ will be moved from the adjacent fixed contact $a^2$ and against the fixed contact $a^4$ whereby coil $A^4$ is substituted for the temperature coil. The bridge should now be balanced and accordingly the reading of the galvanometer be zero. By means of this "balance" test, the correctness of the brige adjustment can be instantly ascertained.

As fully illustrated in Fig. 2, the adjustable resistance D for the variable arm of the Wheatstone bridge is conveniently contained in a separate case apart from such bridge and by means of a knob $d^2$ for making the step-by-step connections and the pointer $d'$, which is borne thereby, the particular connection had is readily observed and may be varied as for the purpose previously described. It will of course be understood that where instead of being designed for the taking of temperatures over a wide range the pyrometer is employed for the indication of temperatures within a narrow range contained within the indicating capacity of the galvanometer, having regard to the fineness of the reading desired, a single fixed resistance may be utilized in place of an adjustable rheostat; in this event such single resistance would preferably be incorporated in the main resistance case. Moreover where the temperature of various points located at different distances from the indicating apparatus requires to be taken, the resistance of the leads will necessarily introduce variation in the combined resistance of such leads with that of the temperature coil, even though the latter be the same in each instance. In order, accordingly, that a single indicating instrument or galvanometer may be employed, I have devised the arrangement further illustrated in Fig. 2 in connection with the switch board $B^2$ by means of which, as will be obvious without specific explanation, connection is had with any desired one of the series of temperature coils B. This arrangement consists in the introduction into the individual leads $b'$ of the respective temperature coils, of an additional coil $b^2$ having a sufficient resistance to bring up the total resistances of the individual leads $b'$ and common lead $b^3$ to such thermo-sensitive coils, combined with the resistances of the latter, to a predetermined maximum. By thus standardizing the normal resistance of the several thermo-sensitive resistances and the leads thereto there obviously need be no readjustment of the calibration of the instrument to record with equal accurateness the temperature changes to which any one of said thermo-sensitive resistances is exposed.

In the foregoing description the temperature coil has been incidentally referred to as being made of platinum wire. This metal is generally recognized as the most desirable for this purpose; but obviously my invention is not limited to the employment of any particular metal in such connection or to any particular construction of the temperature coil. Especially is this the case since by the several improvements introduced in the apparatus herein presented the utilization of apparatus of this sort for the taking of low and normal temperatures, as well as extremely high temperatures is rendered possible, the one requisite, namely that of non-fusibility represented by platinum is no longer an invariable one. In general it will hence suffice to state that the temperature coil should be made of a metal having a high temperature coefficient, while obviously for the other coils entering into the bridge a metal having a very low temperature coefficient is preferable. So, too, with regard to the variable resistance shunt circuit C, it should be explained that, inasmuch as the function of this detail is to properly regulate the potential across the indicating instrument, other methods of accomplishing this result, such as a similar circuit in series with the battery, are included within the scope of my invention. It should furthermore be explained that the term "galvanometer" has purposely been employed in a generic sense to designate any suitable electrical measuring instrument. Preferably, as indicated, it will be the potential across the bridge terminals that will be measured and a millivoltmeter will hence be the instrument employed. The measurement of potential will obviously lend itself to much finer gradation, and with apparatus such as I have heretofore described it is possible to indicate temperatures down to very small fractions of degrees Fahrenheit. Such refinement in reading would of course be inconsequential were not an equal degree of accuracy coupled therewith; this, however, I also secure by rendering the apparatus independent of any laboratory calibration, the testing and adjustment thereof being so simple and easily effected as to conveniently precede each individual reading if desired.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In temperature measuring apparatus, the combination of a thermo-sensitive resistance and other known resistances arranged to form a Wheatstone bridge, a sensitive galvanometer for such bridge, an adjustable resistance shunt circuit for said galvanometer, an adjustable resistance adapted to be included in circuit with said thermo-sensitive resistance, and a known resistance adapted to be substituted in such bridge for said thermo-sensitive resistance and having a resistance equal to the known resistance wherewith it is paired.

2. In temperature measuring apparatus, the combination of a thermo-sensitive resistance and other known resistances arranged to form a Wheatstone bridge, a sensitive galvanometer for such bridge, an adjustable resistance shunt circuit for said galvanometer, an adjustable resistance adapted to be included in circuit with said thermo-sensitive resistance, and a known resistance adapted to be substituted in such bridge for said thermo-sensitive resistance and having a resistance adapted to bring said galvanometer to a predetermined reading.

3. In temperature measuring apparatus, the combination of a thermo-sensitive resistance and other known resistances arranged to form a Wheatstone bridge, a sensitive galvanometer for such bridge, an adjustable resistance shunt circuit for said galvanometer, an adjustable resistance adapted to be included in circuit with said thermo-sensitive resistance, and two known resistances respectively adapted to be substituted in such bridge for said thermo-sensitive resistance, the one resistance being equal to the known resistance wherewith it is paired, and the other being greater than such known resistance and adapted to bring said galvanometer to a predetermined reading.

4. In temperature measuring apparatus, the combination, with three known resistances, of a plurality of thermo-sensitive resistances respectively adapted to be arranged with said known resistances to form a Wheatstone bridge, the combined resistance of each thermo-sensitive resistance, when subjected to a predetermined temperature, and its leads being equal to a predetermined resistance; a sensitive galvanometer for said bridge; an adjustable resistance shunt circuit for said galvanometer; and a step-by-step resistance adapted to be included in circuit with whichever of said thermo-sensitive resistances is included in said bridge, the steps of said step-by-step resistance corresponding to predetermined ranges of temperature, substantially as described.

Signed by me, this 15th day of May, 1908.

H. EARL BEIGHLEE.

Attested by—
MARY ISRAEL,
JNO. F. OBERLIN.